US011681706B2

(12) United States Patent
Kuyel et al.

(10) Patent No.: US 11,681,706 B2
(45) Date of Patent: Jun. 20, 2023

(54) SYSTEM AND METHOD FOR ACCELERATED DATA SEARCH OF DATABASE STORAGE SYSTEM

(71) Applicant: SK hynix Inc., Gyeonggi-do (KR)

(72) Inventors: Andrey Kuyel, Minsk (BY); Yury Tsybulka, Minsk (BY)

(73) Assignee: SK hynix Inc., Gyeonggi-do (KR)

( * ) Notice: Subject to any disclaimer, the term of this patent is extended or adjusted under 35 U.S.C. 154(b) by 42 days.

(21) Appl. No.: 17/374,709

(22) Filed: Jul. 13, 2021

(65) Prior Publication Data
US 2023/0029029 A1    Jan. 26, 2023

(51) Int. Cl.
G06F 16/2455    (2019.01)
G06F 16/248    (2019.01)
G06F 16/22    (2019.01)

(52) U.S. Cl.
CPC ...... G06F 16/24554 (2019.01); G06F 16/221 (2019.01); G06F 16/2282 (2019.01); G06F 16/248 (2019.01)

(58) Field of Classification Search
None
See application file for complete search history.

(56) References Cited

U.S. PATENT DOCUMENTS

| | | | |
|---|---|---|---|
| 10,552,490 B2 | 2/2020 | Gross et al. | |
| 10,803,035 B2 | 10/2020 | Kurokawa et al. | |
| 11,531,586 B2* | 12/2022 | Park | G06F 11/108 |
| 2019/0310977 A1* | 10/2019 | Pal | G06F 16/2455 |
| 2020/0050586 A1* | 2/2020 | Pal | G06F 16/148 |
| 2020/0050607 A1* | 2/2020 | Pal | G06F 16/24545 |
| 2020/0050612 A1* | 2/2020 | Bhattacharjee | G06F 16/2471 |
| 2020/0065303 A1* | 2/2020 | Bhattacharjee | G06F 16/278 |
| 2020/0364223 A1* | 11/2020 | Pal | G06F 9/5016 |
| 2021/0117425 A1* | 4/2021 | Rao | G06F 8/61 |
| 2021/0342125 A1* | 11/2021 | Burnett | G06F 16/252 |
| 2022/0156145 A1* | 5/2022 | Park | G06F 11/1068 |
| 2022/0229595 A1* | 7/2022 | Lee | G06F 3/0679 |
| 2023/0004325 A1* | 1/2023 | Byun | G06F 3/0679 |
| 2023/0029029 A1* | 1/2023 | Kuyel | G06F 16/24554 |
| 2023/0045933 A1* | 2/2023 | Zalivaka | G06F 3/064 |
| 2023/0056686 A1* | 2/2023 | Hong | H03K 19/1774 |

OTHER PUBLICATIONS

Petrov A, Database Internals, A Deep Dive into How Distributed Systems Work, Oct. 2019, First Edition, O'Reilly Media, Inc. CA, USA.
Ailamaki A., et al., Data page layouts for relational databases on deep memory hierarchies, The VLDB Journal, Nov. 2002.

* cited by examiner

*Primary Examiner* — Kim T Nguyen
(74) *Attorney, Agent, or Firm* — IP & T Group LLP

(57) ABSTRACT

Embodiments of the present disclosure provide a system for accelerated data search of a database storage system. The system includes a host device including a database storage engine; and a memory system including a controller and a memory device, which includes a plurality of pages storing multiple records. The controller includes a page processing accelerator configured to: read, from the plurality of pages, multiple pages in response to a filtered read command; filter particular pages among the multiple pages based on a column full search condition, the filtered pages including entries satisfying the column full search condition; and transfer, to the host device, information regarding the filtered pages.

20 Claims, 12 Drawing Sheets

SYSTEM AND METHOD FOR ACCELERATED DATA SEARCH OF DATABASE STORAGE SYSTEM

BACKGROUND

1. Field

Embodiments of the present disclosure relate to data search schemes for database storage systems.

2. Description of the Related Art

The computer environment paradigm has shifted to ubiquitous computing systems that can be used anytime and anywhere. As a result, the use of portable electronic devices such as mobile phones, digital cameras, and notebook computers has rapidly increased. These portable electronic devices generally use a memory system having memory device(s), that is, data storage device(s). The data storage device is used as a main memory device or an auxiliary memory device of the portable electronic devices.

Memory systems using memory devices provide excellent stability, durability, high information access speed, and low power consumption, since the memory devices have no moving parts. Examples of memory systems having such advantages include universal serial bus (USB) memory devices, memory cards having various interfaces such as a universal flash storage (UFS), and solid state drives (SSDs). Memory systems may be used for database storage systems.

SUMMARY

Aspects of the present invention include a system for accelerated data search of a database storage system and a method thereof.

In one aspect of the present invention, a system includes a host device including a database storage engine; and a memory system including a controller and a memory device, which includes a plurality of pages storing multiple records. The controller includes a page processing accelerator configured to: read, from the plurality of pages, multiple pages in response to a filtered read command; filter particular pages among the multiple pages based on a column full search condition, the filtered pages including entries satisfying the column full search condition; and transfer, to the host device, information regarding the filtered pages.

In another aspect of the present invention, a method for operating a system including a host device including a database storage engine, and a memory system including a controller and a memory device, which includes a plurality of pages storing multiple records, includes: configuring a page processing accelerator in the controller; reading, by the page processing accelerator, from the plurality of pages, multiple pages in response to a filtered read command; filtering, by the page processing accelerator, particular pages among the multiple pages based on a column full search condition, the filtered pages including entries satisfying the column full search condition; and transferring, by the controller, to the host device, information regarding the filtered pages.

Additional aspects of the present invention will become apparent from the following description.

DETAILED DESCRIPTION

Figure 1:
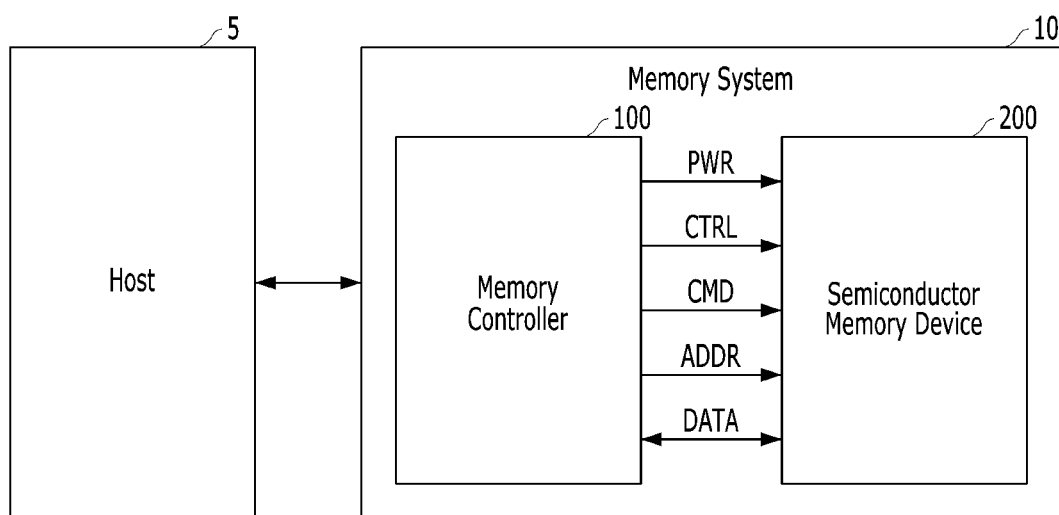
FIG. 1 is a block diagram illustrating a data processing system in accordance with an embodiment of the present invention.

Various embodiments of the present invention are described below in more detail with reference to the accompanying drawings. The present invention may, however, be embodied in different forms and thus should not be construed as limited to the embodiments set forth herein. Rather, these embodiments are provided so that this disclosure is thorough and complete, and fully conveys the scope of the present invention to those skilled in the art. Moreover, reference herein to "an embodiment," "another embodiment," or the like is not necessarily to only one embodiment, and different references to any such phrase are not necessarily to the same embodiment(s). The term "embodiments" as used herein does not necessarily refer to all embodiments. Throughout the disclosure, like reference numerals refer to like parts in the figures and embodiments of the present invention.

The present invention can be implemented in numerous ways, including as a process; an apparatus; a system; a computer program product embodied on a computer-readable storage medium; and/or a processor, such as a processor suitable for executing instructions stored on and/or provided by a memory coupled to the processor. In this specification, these implementations, or any other form that the present invention may take, may be referred to as techniques. In general, the order of the operations of disclosed processes may be altered within the scope of the present invention. Unless stated otherwise, a component such as a processor or a memory described as being suitable for performing a task may be implemented as a general component that is temporarily configured to perform the task at a given time or a specific component that is manufactured to perform the task. As used herein, the term 'processor' or the like refers to one or more devices, circuits, and/or processing cores suitable for processing data, such as computer program instructions.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device.

A detailed description of embodiments of the present invention is provided below along with accompanying figures that illustrate aspects of the present invention. The present invention is described in connection with such embodiments, but the present invention is not limited to any embodiment. The scope of the present invention is limited only by the claims. The present invention encompasses numerous alternatives, modifications and equivalents within the scope of the claims. Numerous specific details are set forth in the following description in order to provide a thorough understanding of the present invention. These details are provided for the purpose of example; the present invention may be practiced according to the claims without some or all of these specific details. For clarity, technical material that is known in technical fields related to the present invention has not been described in detail so that the present invention is not unnecessarily obscured.

FIG. 1 is a block diagram illustrating a data processing system 2 in accordance with an embodiment of the present invention.

Referring FIG. 1, the data processing system 2 may include a host device 5 and a memory system 10. The memory system 10 may receive a request from the host device 5 and operate in response to the received request. For example, the memory system 10 may store data to be accessed by the host device 5.

The host device 5 may be implemented with any of various types of electronic devices. In various embodiments, the host device 5 may include an electronic device such as a desktop computer, a workstation, a three-dimensional (3D) television, a smart television, a digital audio recorder, a digital audio player, a digital picture recorder, a digital picture player, and/or a digital video recorder and a digital video player. In various embodiments, the host device 5 may include a portable electronic device such as a mobile phone, a smart phone, an e-book, an MP3 player, a portable multimedia player (PMP), and/or a portable game player.

The memory system 10 may be implemented with any of various types of storage devices such as a solid state drive (SSD) and a memory card. In various embodiments, the memory system 10 may be provided as one of various components in an electronic device such as a computer, an ultra-mobile personal computer (PC) (UMPC), a workstation, a net-book computer, a personal digital assistant (PDA), a portable computer, a web tablet PC, a wireless phone, a mobile phone, a smart phone, an e-book reader, a portable multimedia player (PMP), a portable game device, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage device of a data center, a device capable of receiving and transmitting information in a wireless environment, a radio-frequency identification (RFID) device, as well as one of various electronic devices of a home network, one of various electronic devices of a computer network, one of electronic devices of a telematics network, or one of various components of a computing system.

The memory system 10 may include a memory controller 100 and a semiconductor memory device 200. The memory controller 100 may control overall operations of the semiconductor memory device 200.

The semiconductor memory device 200 may perform one or more erase, program, and read operations under the control of the memory controller 100. The semiconductor memory device 200 may receive a command CMD, an address ADDR and data DATA through input/output lines. The semiconductor memory device 200 may receive power PWR through a power line and a control signal CTRL through a control line. The control signal CTRL may include a command latch enable signal, an address latch enable signal, a chip enable signal, a write enable signal, a read enable signal, as well as other operational signals depending on design and configuration of the memory system 10.

The memory controller 100 and the semiconductor memory device 200 may be integrated in a single semiconductor device such as a solid state drive (SSD). The SSD may include a storage device for storing data therein. When the semiconductor memory system 10 is used in an SSD, operation speed of a host device (e.g., host device 5 of FIG. 1) coupled to the memory system 10 may remarkably improve.

The memory controller 100 and the semiconductor memory device 200 may be integrated in a single semiconductor device such as a memory card. For example, the memory controller 100 and the semiconductor memory device 200 may be integrated to configure a personal computer (PC) card of personal computer memory card international association (PCMCIA), a compact flash (CF) card, a smart media (SM) card, a memory stick, a multimedia card (MMC), a reduced-size multimedia card (RS-MMC), a micro-size version of MMC (MMCmicro), a secure digital (SD) card, a mini secure digital (miniSD) card, a micro secure digital (microSD) card, a secure digital high capacity (SDHC), and/or a universal flash storage (UFS).

Figure 2:
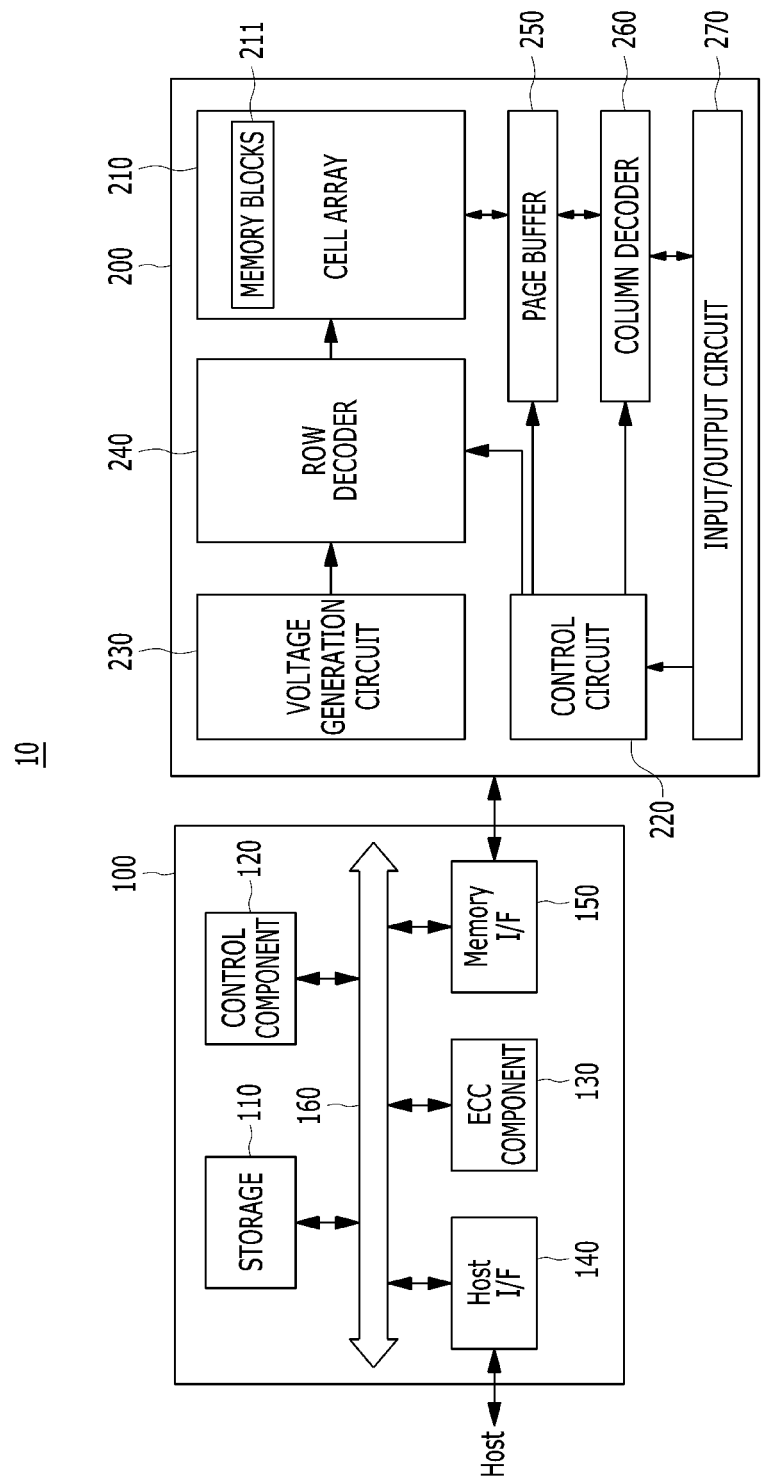
FIG. 2 is a block diagram illustrating a memory system in accordance with an embodiment of the present invention.

FIG. 2 is a block diagram illustrating a memory system in accordance with an embodiment of the present invention. For example, the memory system of FIG. 2 may depict the memory system 10 shown in FIG. 1.

Referring to FIG. 2, the memory system 10 may include a memory controller 100 and a semiconductor memory device 200. The memory system 10 may operate in response to a request from a host device (e.g., host device 5 of FIG. 1), and in particular, store data to be accessed by the host device.

The memory device 200 may store data to be accessed by the host device.

The memory device 200 may be implemented with a volatile memory device such as a dynamic random access memory (DRAM) and/or a static random access memory (SRAM) or a non-volatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM), and/or a resistive RAM (RRAM).

The controller 100 may control storage of data in the memory device 200. For example, the controller 100 may control the memory device 200 in response to a request from the host device. The controller 100 may provide data read from the memory device 200 to the host device, and may store data provided from the host device into the memory device 200.

The controller 100 may include a storage 110, a control component 120 which may be implemented as a processor such as a central processing unit (CPU), an error correction code (ECC) component 130, a host interface (I/F) 140 and a memory interface (I/F) 150, which are coupled through a bus 160.

The storage 110 may serve as a working memory of the memory system 10 and the controller 100, and store data for driving the memory system 10 and the controller 100. When the controller 100 controls operations of the memory device 200, the storage 110 may store data used by the controller 100 and the memory device 200 for such operations as read, write, program and erase operations.

The storage 110 may be implemented with a volatile memory such as a static random access memory (SRAM) or a dynamic random access memory (DRAM). As described above, the storage 110 may store data used by the host device in the memory device 200 for the read and write operations. To store the data, the storage 110 may include a program memory, a data memory, a write buffer, a read buffer, a map buffer, and the like.

The control component 120 may control general operations of the memory system 10, and a write operation or a read operation for the memory device 200 in response to a write request or a read request from the host device. The control component 120 may drive firmware, which is referred to as a flash translation layer (FTL), to control general operations of the memory system 10. For example, the FTL may perform operations such as logical-to-physical (L2P) mapping, wear leveling, garbage collection, and/or bad block handling. The L2P mapping is known as logical block addressing (LBA).

The ECC component 130 may detect and correct errors in the data read from the memory device 200 during the read operation. The ECC component 130 may not correct error bits when the number of the error bits is greater than or equal to a threshold number of correctable error bits, and instead may output an error correction fail signal indicating failure in correcting the error bits.

In various embodiments, the ECC component 130 may perform an error correction operation based on a coded modulation such as a low density parity check (LDPC) code, a Bose-Chaudhuri-Hocquenghem (BCH) code, a turbo code, a turbo product code (TPC), a Reed-Solomon (RS) code, a convolution code, a recursive systematic code (RSC), a trellis-coded modulation (TCM), or a Block coded modulation (BCM). However, error correction is not limited to these techniques. As such, the ECC component 130 may include any and all circuits, systems or devices for suitable error correction operation.

The host interface 140 may communicate with the host device through one or more of various communication standards or interfaces such as a universal serial bus (USB), a multi-media card (MMC), a peripheral component interconnect express (PCI-e or PCIe), a small computer system interface (SCSI), a serial-attached SCSI (SAS), a serial advanced technology attachment (SATA), a parallel advanced technology attachment (PATA), an enhanced small disk interface (ESDI), and an integrated drive electronics (IDE).

The memory interface 150 may provide an interface between the controller 100 and the memory device 200 to allow the controller 100 to control the memory device 200 in response to a request from the host device. The memory interface 150 may generate control signals for the memory device 200 and process data under the control of the control component 120. When the memory device 200 is a flash memory such as a NAND flash memory, the memory interface 150 may generate control signals for the memory and process data under the control of the control component 120.

The memory device 200 may include a memory cell array 210, a control circuit 220, a voltage generation circuit 230, a row decoder 240, a page buffer 250 which may be in the form of an array of page buffers, a column decoder 260, and an input and output (input/output) circuit 270. The memory cell array 210 may include a plurality of memory blocks 211 which may store data. The voltage generation circuit 230, the row decoder 240, the page buffer array 250, the column decoder 260 and the input/output circuit 270 may form a peripheral circuit for the memory cell array 210. The peripheral circuit may perform a program, read, or erase operation of the memory cell array 210. The control circuit 220 may control the peripheral circuit.

The voltage generation circuit 230 may generate operation voltages of various levels. For example, in an erase operation, the voltage generation circuit 230 may generate operation voltages of various levels such as an erase voltage and a pass voltage.

The row decoder 240 may be in electrical communication with the voltage generation circuit 230, and the plurality of memory blocks 211. The row decoder 240 may select at least one memory block among the plurality of memory blocks 211 in response to a row address generated by the control circuit 220, and transmit operation voltages supplied from the voltage generation circuit 230 to the selected memory blocks.

Figure 3:
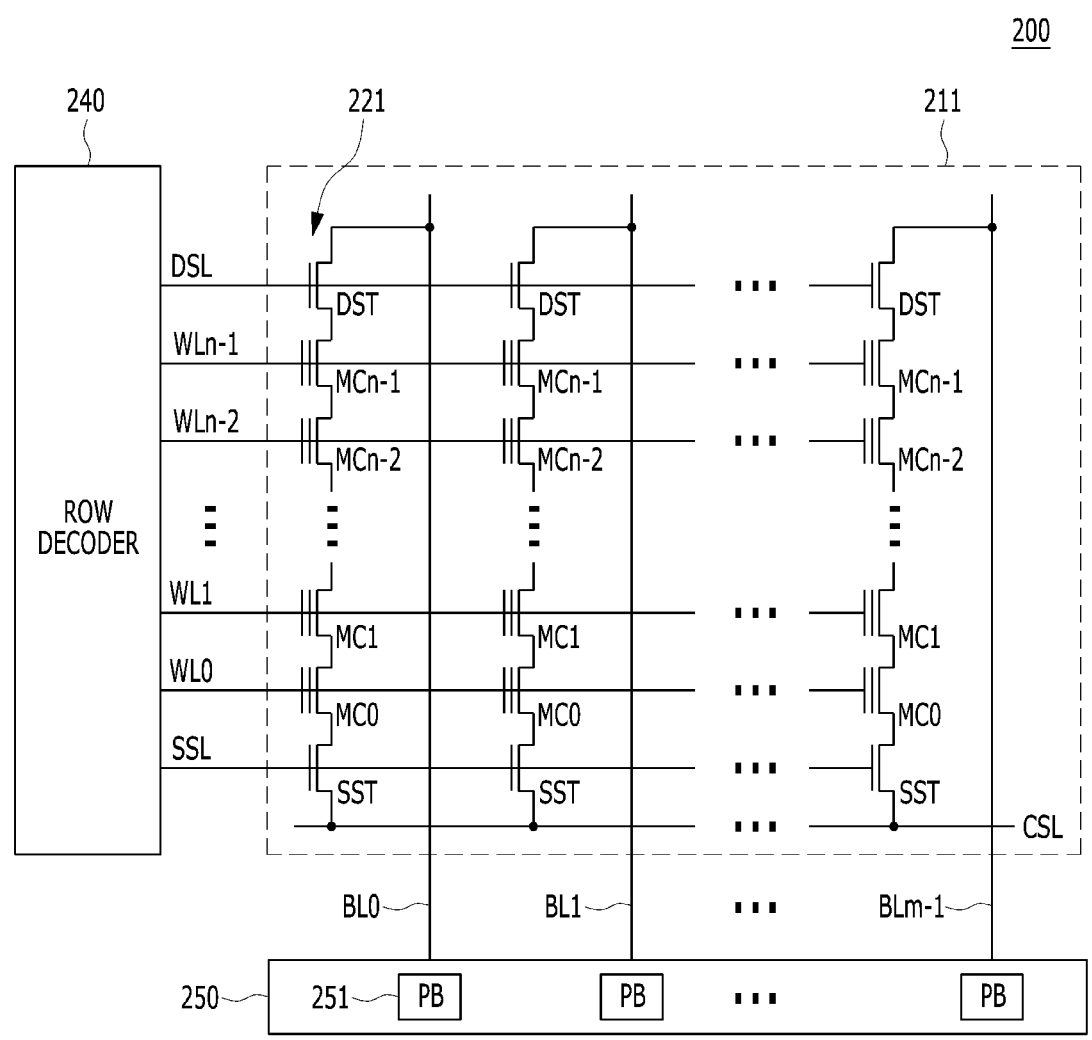
FIG. 3 is a circuit diagram illustrating a memory block of a memory device in accordance with an embodiment of the present invention.

The page buffer 250 may be coupled with the memory cell array 210 through bit lines BL (shown in FIG. 3). The page buffer 250 may precharge the bit lines BL with a positive voltage, transmit data to and receive data from, a selected memory block in program and read operations, or temporarily store transmitted data in response to page buffer control signal(s) generated by the control circuit 220.

The column decoder 260 may transmit data to and receive data from, the page buffer 250 or transmit and receive data to and from the input/output circuit 270.

The input/output circuit 270 may transmit to the control circuit 220 a command and an address, received from an external device (e.g., the memory controller 100 of FIG. 1), transmit data from the external device to the column decoder 260, or output data from the column decoder 260 to the external device, through the input/output circuit 270.

The control circuit 220 may control the peripheral circuit in response to the command and the address.

FIG. 3 is a circuit diagram illustrating a memory block of a semiconductor memory device in accordance with an embodiment of the present invention. For example, the memory block of FIG. 3 may be any of the memory blocks 211 of the memory cell array 210 shown in FIG. 2.

Referring to FIG. 3, the memory block 211 may include a plurality of word lines WL0 to WLn−1, a drain select line DSL and a source select line SSL coupled to the row decoder 240. These lines may be arranged in parallel, with the plurality of word lines between the DSL and SSL.

The memory block 211 may further include a plurality of cell strings 221 respectively coupled to bit lines BL0 to BLm−1. The cell string of each column may include one or more drain selection transistors DST and one or more source selection transistors SST. In the illustrated embodiment, each cell string has one DST and one SST. In a cell string, a plurality of memory cells or memory cell transistors MC0 to MCn−1 may be serially coupled between the selection transistors DST and SST. Each of the memory cells may be formed as a multiple level cell. For example, each of the memory cells may be formed as a single level cell (SLC) storing 1 bit of data. Each of the memory cells may be formed as a multi-level cell (MLC) storing 2 bits of data. Each of the memory cells may be formed as a triple-level cell (TLC) storing 3 bits of data. Each of the memory cells may be formed as a quadruple-level cell (QLC) storing 4 bits of data.

The source of the SST in each cell string may be coupled to a common source line CSL, and the drain of each DST may be coupled to the corresponding bit line. Gates of the SSTs in the cell strings may be coupled to the SSL, and gates of the DSTs in the cell strings may be coupled to the DSL. Gates of the memory cells across the cell strings may be coupled to respective word lines. That is, the gates of memory cells MC0 are coupled to corresponding word line WL0, the gates of memory cells MC1 are coupled to corresponding word line WL1, etc. The group of memory cells coupled to a particular word line may be referred to as a physical page. Therefore, the number of physical pages in the memory block 211 may correspond to the number of word lines.

The page buffer array 250 may include a plurality of page buffers 251 that are coupled to the bit lines BL0 to BLm−1. The page buffers 251 may operate in response to page buffer control signals. For example, the page buffers 251 may temporarily store data received through the bit lines BL0 to BLm−1 or sense voltages or currents of the bit lines during a read or verify operation.

In some embodiments, the memory blocks 211 may include a NAND-type flash memory cell. However, the memory blocks 211 are not limited to such cell type, but may include NOR-type flash memory cell(s). Memory cell array 210 may be implemented as a hybrid flash memory in which two or more types of memory cells are combined, or one-NAND flash memory in which a controller is embedded inside a memory chip.

Figure 4:
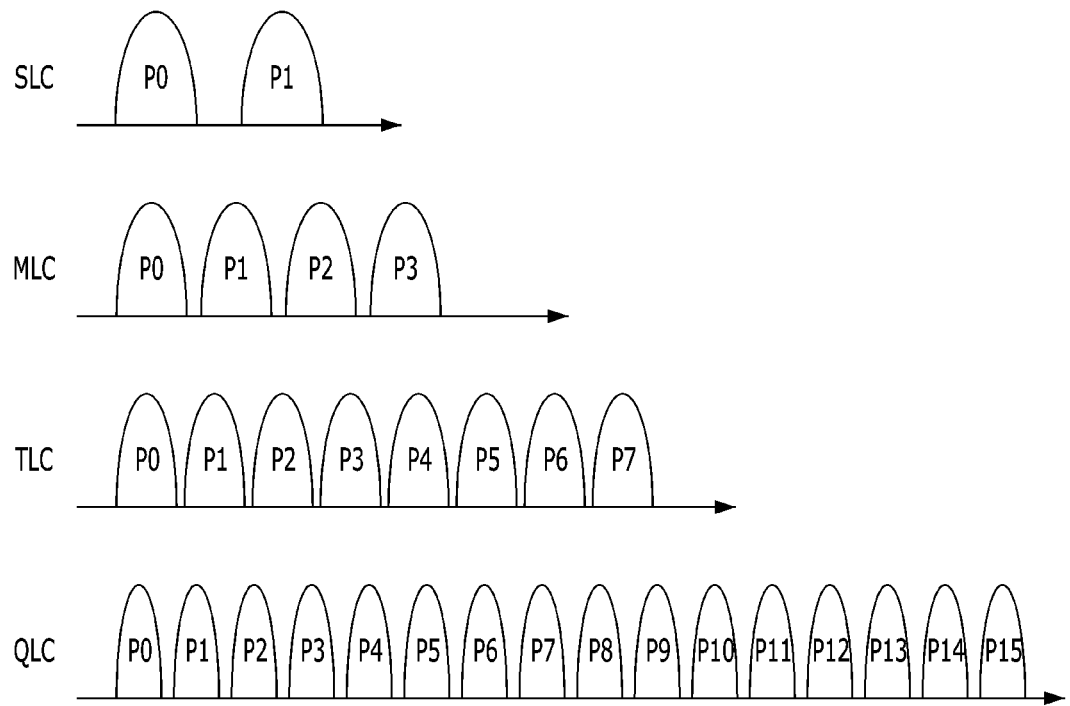
FIG. 4 is a diagram illustrating distributions of states for different types of cells of a memory device in accordance with an embodiment of the present invention.

FIG. 4 is a diagram illustrating distributions of states or program voltage (PV) levels for different types of cells of a memory device in accordance with an embodiment of the present invention.

Referring to FIG. 4, each of memory cells may be implemented with a specific type of cell, for example, a single level cell (SLC) storing 1 bit of data, a multi-level cell (MLC) storing 2 bits of data, a triple-level cell (TLC) storing 3 bits of data, or a quadruple-level cell (QLC) storing 4 bits of data. Usually, all memory cells in a particular memory device are of the same type, but that is not a requirement.

An SLC may include two states P0 and P1. P0 may indicate an erase state, and P1 may indicate a program state. Since the SLC can be set in one of two different states, each SLC may program or store 1 bit according to a set coding method. An MLC may include four states P0, P1, P2 and P3. Among these states, P0 may indicate an erase state, and P1 to P3 may indicate program states. Since the MLC can be set in one of four different states, each MLC may program or store two bits according to a set coding method. A TLC may include eight states P0 to P7. Among these states, P0 may indicate an erase state, and P1 to P7 may indicate program states. Since the TLC can be set in one of eight different states, each TLC may program or store three bits according to a set coding method. A QLC may include 16 states P0 to P15. Among these states, P0 may indicate an erase state, and P1 to P15 may indicate program states. Since the QLC can be set in one of sixteen different states, each QLC may program or store four bits according to a set coding method.

Referring back to FIGS. 2 and 3, the memory device 200 may include a plurality of memory cells (e.g., NAND flash memory cells). The memory cells are arranged in an array of rows and columns as shown in FIG. 3. The cells in each row are connected to a word line (e.g., WL0), while the cells in each column are coupled to a bit line (e.g., BL0). These word and bit lines are used for read and write operations. During a write operation, the data to be written ('1' or '0') is provided at the bit line while the word line is asserted. During a read operation, the word line is again asserted, and the threshold voltage of each cell can then be acquired from the bit line. Multiple pages may share the memory cells that belong to (i.e., are coupled to) the same word line. When the memory cells are implemented with MLCs, the multiple pages include a most significant bit (MSB) page and a least significant bit (LSB) page. When the memory cells are implemented with TLCs, the multiple pages include an MSB page, a center significant bit (CSB) page and an LSB page. When the memory cells are implemented with QLCs, the multiple pages include an MSB page, a center most significant bit (CMSB) page, a center least significant bit (CLSB) page and an LSB page. The memory cells may be programmed using a coding scheme (e.g., Gray coding) in order to increase the capacity of the memory system 10 such as SSD.

Figure 5A:
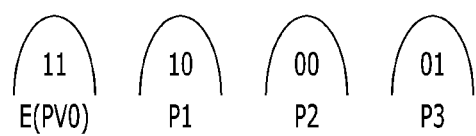
FIG. 5A is a diagram illustrating an example of Gray coding for a multi-level cell (MLC) in accordance with an embodiment of the present invention.

FIG. 5A is a diagram illustrating an example of coding for a multi-level cell (MLC) in accordance with an embodiment of the present invention.

Referring to FIG. 5A, an MLC may be programmed using a set type of coding. An MLC may have 4 program states, which include an erased state E (or PV0) and a first program state PV1 to a third program state PV3. The erased state E (or PV0) may correspond to "11." The first program state PV1 may correspond to "10." The second program state PV2 may correspond to "00." The third program state PV3 may correspond to "01."

Figure 5B:
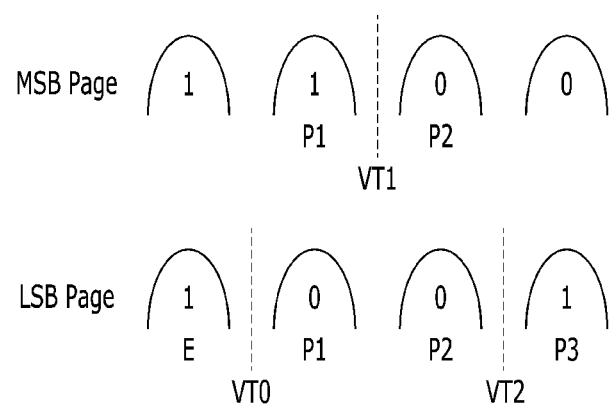
FIG. 5B is a diagram illustrating state distributions for pages of a multi-level cell (MLC) in accordance with an embodiment of the present invention.

In the MLC, as shown in FIG. 5B, there are 2 types of pages including LSB and MSB pages. 1 or 2 thresholds may be applied in order to retrieve data from the MLC. For an MSB page, the single threshold value is VT1. VT1 distinguishes between the first program state PV1 and the second program state PV2. For an LSB page, 2 thresholds include a threshold value VT0 and a threshold value VT2. VT0 distinguishes between the erased state E and the first program state PV1. VT2 distinguishes between the second program state PV2 and the third program state PV3.

Figure 6A:
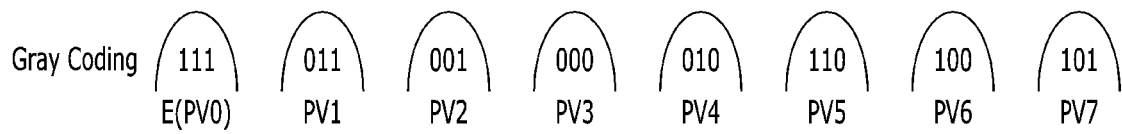
FIG. 6A is a diagram illustrating an example of Gray coding for a triple-level cell (TLC) in accordance with an embodiment of the present invention.

FIG. 6A is a diagram illustrating an example of Gray coding for a triple-level cell (TLC) in accordance with an embodiment of the present invention.

Referring to FIG. 6A, a TLC may be programmed using Gray coding. A TLC may have 8 program states, which include an erased state E (or PV0) and a first program state PV1 to a seventh program state PV7. The erased state E (or PV0) may correspond to "111." The first program state PV1 may correspond to "011." The second program state PV2 may correspond to "001." The third program state PV3 may correspond to "000." The fourth program state PV4 may correspond to "010." The fifth program state PV5 may correspond to "110." The sixth program state PV6 may correspond to "100." The seventh program state PV7 may correspond to "101."

Figure 6B:
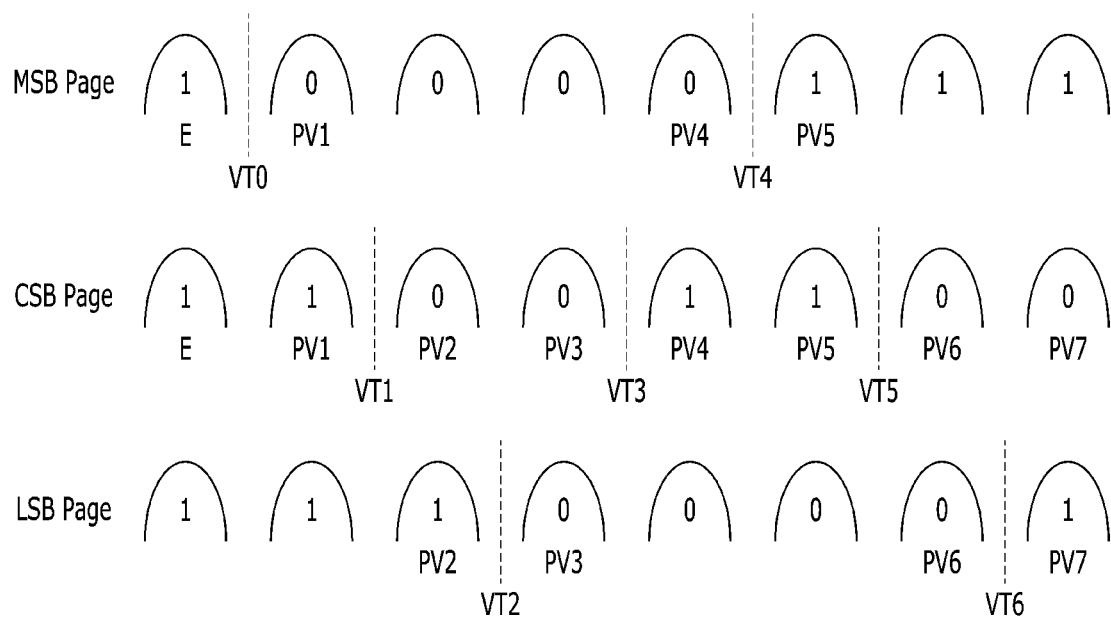
FIG. 6B is a diagram illustrating state distributions for pages of a triple-level cell (TLC) in accordance with an embodiment of the present invention.

In the TLC, as shown in FIG. 6B, there are 3 types of pages including LSB, CSB and MSB pages. 2 or 3 thresholds may be applied in order to retrieve data from the TLC. For an MSB page, 2 thresholds include a threshold value VT0 that distinguishes between an erase state E and a first program state PV1 and a threshold value VT4 that distinguishes between a fourth program state PV4 and a fifth program state PV5. For a CSB page, 3 thresholds include VT1, VT3 and VT5. VT1 distinguishes between a first program state PV1 and a second program state PV2. VT3 distinguishes between a third program state PV3 and the fourth program state PV4. VT5 distinguishes between the fifth program state PV5 and the sixth program state PV6. For an LSB page, 2 thresholds include VT2 and VT6. VT2 distinguishes between the second program state PV2 and the third program state PV3. VT6 distinguishes between the sixth program state PV6 and a seventh program state PV7.

Figure 7A:
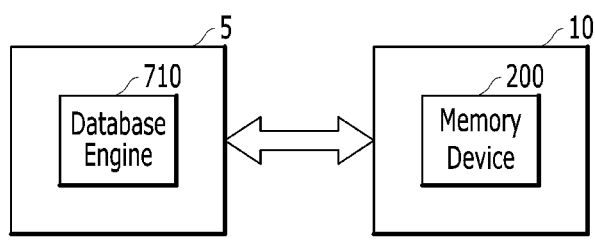
FIG. 7A schematically illustrates a database storage system in accordance with an embodiment of the present invention.

As described above, the host device 5 may be coupled to the memory system 10 to configure the data processing system 2. Further, the host device 5 may configure a database storage system (or a database system, a database management system) as shown in FIG. 7A. Database systems may use files for storing data. Each file may be a set of database records and each record may be a set of fields.

Figure 7B:
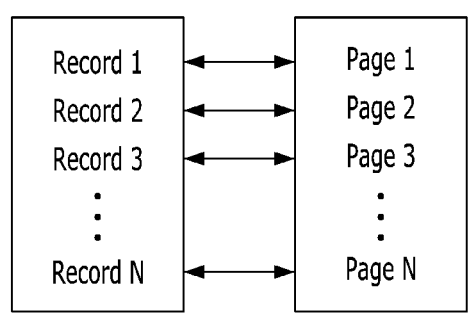
FIG. 7B schematically illustrates mapping data records to pages of a storage device in a database storage system in accordance with an embodiment of the present invention.

Referring to FIG. 7A, the host device 5 may include a database engine (or a database storage engine) 710. The database storage engine 710 may be optimized for input and output (I/O) performance. One of the commonly I/O optimization methods is to map database records to pages of a memory system (or a storage device) (e.g., SSD). As shown in FIG. 7B, N database records may be mapped to N pages, respectively. In other words, database records of a database table are aligned to pages in a memory device (e.g., NAND pages) of the SSD, respectively. The alignment (or mapping) of database record fields to a single page may enable access to all record fields located within the page, thus eliminating the need to read multiple NAND pages in order to reconstruct a single database record. Database attributes arrangement within each NAND page may be implemented with various methods. The mapping may be done in a way that minimizes storage overhead per stored data record. Two examples of such file organization include an N-ary storage model (NSM) and partition attributes across (PAX). Both database storage file formats are aligned to SSD pages. That is, pages may have NSM or PAX format.

The database storage engine 710 may utilize special indexing data structures for efficient database record retrieval. Data retrieval speed improvement may be achieved by utilization of indexing data structures, e.g., database columns indexing. A database index may be a data structure that improves the speed of data retrieval operations on a database table at the cost of additional writes and storage space to maintain the index data structure. Indexes may be used to quickly locate data without having to search every row in a database table every time a database table is accessed. Indexes may be created using one or more columns of a database table, thus providing the basis for both rapid random lookups and efficient access to ordered records.

Indexing all database columns may be not always feasible or necessary. In the case when the database entry is retrieved by not an index column, a full search across database columns should be performed. This implies that a subset of database table entries, which are mapped to SSD pages, is to be read out from SSD to local cache memory and searched for entries matching lookup constraints. If no records matching the lookup constraints are located within the SSD page, the entire page is discarded from the memory, and the released memory is reclaimed for newly read pages.

Although database indexing significantly improves data retrieval, column index should be made wisely. Redundant indexing results in performance deterioration caused by utilization of extra storage space for indexes maintenance, continuous indexes swapping between a volatile memory and a storage (when indexes cannot fit entirely to main memory), and the increase in database operation execution time. Database operations execution time may increase because of additional operations required for index maintenance during the update, delete, and insert of entries. Moreover, indexes maintenance associated with additional writes to permanent storage media wears a memory device (e.g., NAND) out. Therefore, not all the columns are indexed.

Consequently, if database record retrieval is constrained by an unindexed column, a full search on an unindexed column should be performed. The column full search implies that a database table is read to a memory of the database storage engine 710. Then the database storage engine 710 may seek records matching query conditions among the pages loaded into the memory. Pages that do not contain records matching a search criteria may be discarded from the memory. The full search may be a resource-intensive task that occupies CPU and volatile memory. The speed of the full search of the database storage engine 710 may be constrained by the availability of temporal memory to hold read NAND pages and CPU time spared for the column full search.

Accordingly, embodiments of the present invention provide a system for accelerated data search of a database storage system and a method thereof. Embodiments may provide an embedded reconfigurable SSD hardware accelerator capable of enabling in-SSD database page filtering in order to find pages satisfying column full search criteria. Therefore, embodiments may offload host resources (e.g., RAM and CPU resources) as well as speeding up the entire data retrieving process.

Figure 8:
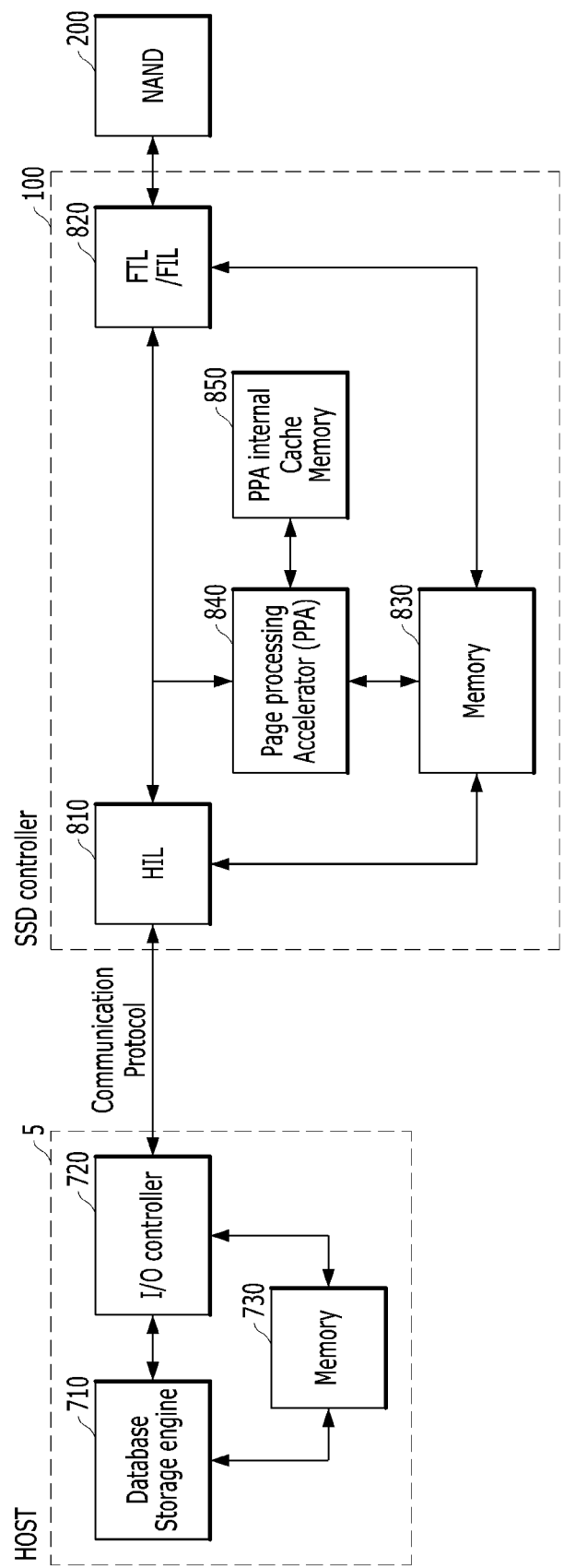
FIG. 8 is a diagram illustrating a database storage system in accordance with an embodiment of the present invention.

FIG. 8 is a diagram illustrating a database storage system in accordance with an embodiment of the present invention.

Referring to FIG. 8, the database storage system may include a host device 5 and a memory system (or a storage device), which is coupled to the host device 5 and includes a controller 100 and a memory device 200. The memory system may be coupled to the host device 5 and may communicate with the host device 5 through one or more of various communication standards or interfaces (or protocols). In some embodiments, the memory system may be a solid state drive (SSD). In this embodiment, the controller 100 may be an SSD controller and the memory device 200 may be a NAND-type flash memory.

The host device 5 may include a data storage engine 710, an input and output (I/O) controller 720 and a memory (i.e., a host memory) 730. The I/O controller 720 may control the interface with the controller 100 of the memory system.

The controller 100 may include a host interface layer (HIL) 810, a flash translation layer (FTL) and a flash interface layer (FIL) 820, a memory (i.e., a SSD controller memory) 830. The HIL 810 may correspond to the host interface 140 in FIG. 2. The FTL may correspond to the control component 120 in FIG. 2. The FIL may correspond to the memory interface 150 in FIG. 2. The memory 830 may correspond to the storage 110 in FIG. 2.

Further, the controller 100 may include a page processing accelerator (PPA) 840 and a PPA internal cache memory 850. The operation and function of the PPA 840 and the cache memory 850 are described below in detail.

The database storage engine 710 may process pages loaded into the memory 730 from the NAND memory device 200. Page processing may be a computation resource-intensive task that is performed by a general-purpose CPU. When the searched database record is not present in the loaded page, the entire page may be discarded. In some embodiments, SSD preliminary filters pages (for example, pages having NSM or PAX format) which include records matching the database search criteria. In this way, SSD offloads the database storage engine 710 from processing pages that do not contain records satisfying the database search criteria. SSD in accordance with the invention, i.e., the database search hardware-accelerated SSD may save CPU time of the database storage engine 710 and memory consumption by delegating the corresponding page processing and filtering operation to a dedicated reconfigurable SSD page processing accelerator (PPA) 840.

The PPA 840 may be integrated into the data path between the HIL 810 and the FTL 820. The page processing hardware accelerator 840 may process pages read from the NAND 200 by the FIL 820 and filters the received pages according to the column full search criteria. Further, the PPA 840 may signal to the HIL 810 whether the processed pages should be transmitted to the host device 5. In the illustrated example of FIG. 8, a single SSD may include a single PPA 840. However, a single SSD may include a large number of independent page processing accelerators in order to enable high processing parallelism that makes them more efficient than general-purpose central processing units (CPUs) for algorithms processing large blocks of data in parallel.

The HIL 810 may support the configuration of the PPA 840 and a custom read command via the host interface protocol. Before the execution of the column full search, the database storage engine 710 may configure the PPA 840 corresponding to the database page storage format. The PPA 840 may be configured via a set command (e.g., an SSD vendor-specific command). Upon completion of the configuration of PPA page format, a column full search task on a database table may be submitted through the SSD vendor-specific read command, which is referred to as a filtered read command (FRC).

In some embodiments, the filtered read command may include the following parameters: column full search criteria (or constraint, condition), a set of identifiers (IDs) of pages to search for, and a destination address of the memory in the host device to transfer pages including records matching the column full search criteria.

The host device 5 may issue a filtered read command to the SSD controller 100 and request the SSD controller 100 to read the specified pages from the NAND memory device 200. In response, the PPA 840 of the SSD controller 100 may filter read pages according to the column full search criteria. The SSD controller 100 may transfer, to the destination location (address) of the host memory 730, one or more pages that include database entries matching the column full search conditions. NAND pages that do not include database records satisfying the search conditions may discarded from the SSD controller memory 830 without transfer to the host device 5. The completion of the column full search task by the PPA 840 may be transmitted to the host device 5 via a set command, which is referred to as a filtered read completion status command.

Figure 9:
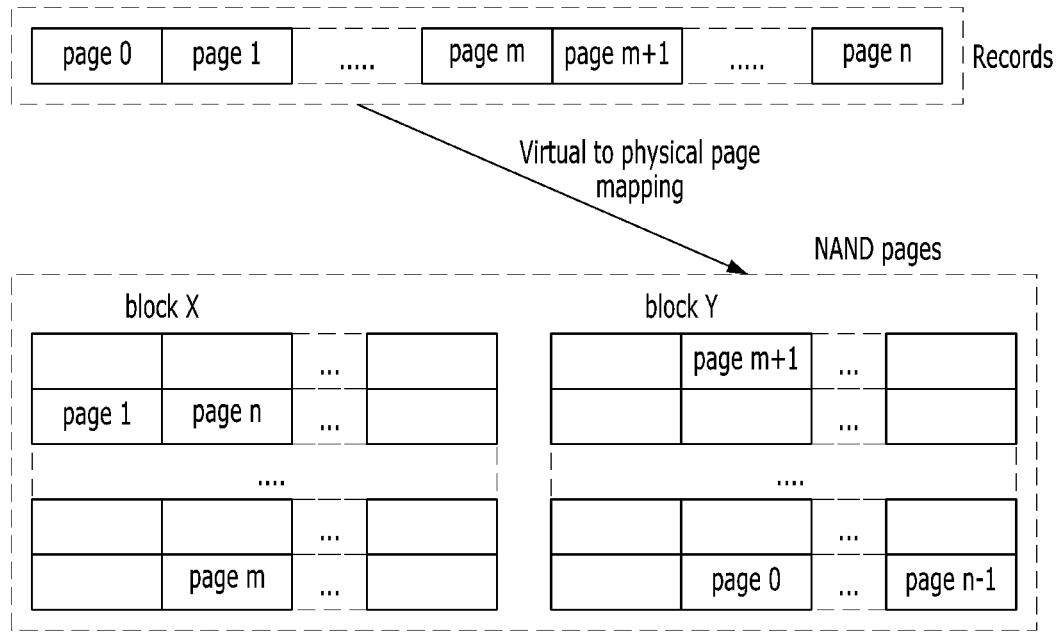
FIG. 9 is a diagram illustrating mapping data records to pages of a storage in a database storage system in accordance with an embodiment of the present invention.

FIG. 9 is a diagram illustrating mapping data records to pages of a storage in a database storage system in accordance with an embodiment of the present invention.

Referring to FIG. 9, the database storage system may store records into files partitioned into fixed-size units called pages. Pages in the database storage system may be aligned in the NAND pages. For example, the record corresponding to a logical page Page0 may be mapped to a physical page Page0 of a memory block Y and the record corresponding to a logical page Page1 may be mapped to a physical page Page1 of a memory block X. The pages may be organized in a way that minimizes storage overhead (operation and storage space) per stored data record. As noted above, examples of such page organization include the N-ary storage model (NSM) and the partition attributes across (PAX) format.

Referring back to FIG. 8, the host interface layer 810 may support the configuration of the page processing accelerator (PPA) 840 and a custom read command, i.e., the filtered read command. The PPA 840 may be adjusted to a corresponding page storage format (e.g., NSM or PAX) through SSD vendor-specific commands. These commands may write and read the configuration PPA address space. The configuration of the PPA 840 may be flexible enough to reconfigure the PPA 840 to the desired page storage layout. The page storage layout may be uniform across the database storage system, therefore, the PPA 840 may be configured only once. Upon the completion of an initial PPA page layout configuration, column full search tasks may be submitted without additional PPA configuration overhead. The column full search task may be submitted to the PPA 840 through the SSD vendor-specific read command (i.e., filtered read command). The PPA 840 may read NAND pages, parse NAND pages according to the page format (or layout), deserialize record fields and determine records that satisfy the column full search conditions, based on the filtered read command. Upon completion of processing based on the filtered read command, the SSD controller 100 may notify the host device 5 by sending the corresponding completion status command.

Figure 10:
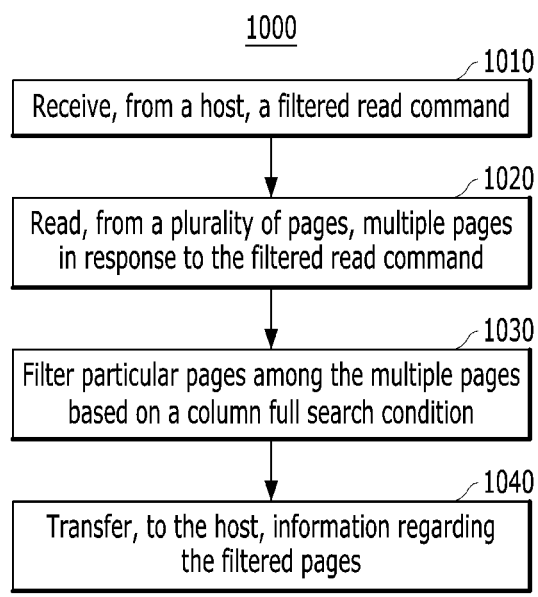
FIG. 10 is a flowchart illustrating a method for operating a memory system for accelerated database search of a database storage system in accordance with an embodiment of the present invention.

FIG. 10 is a flowchart illustrating a method 1000 for operating a memory system for accelerated database search of a database storage system in accordance with an embodiment of the present invention.

Referring to FIG. 10, the method 1000 may be controlled by the SSD controller 100 including the PPA 840 in FIG. 8. In operation 1010, the SSD controller 100 may receive, from the host device 5, a set command (e.g., filtered read command). In operation 1020, the SSD controller 100 may read, from a plurality of pages of the memory device 200, multiple pages in response to the filtered read command. In operation 1030, the SSD controller 100 may filter particular pages among the multiple pages based on a column full search condition, which is included in the set command. The filtered pages may include entries satisfying the column full search condition. In operation 1010, the SSD controller 100 may transfer, to the host device 200, information regarding the filtered pages.

Figure 11:
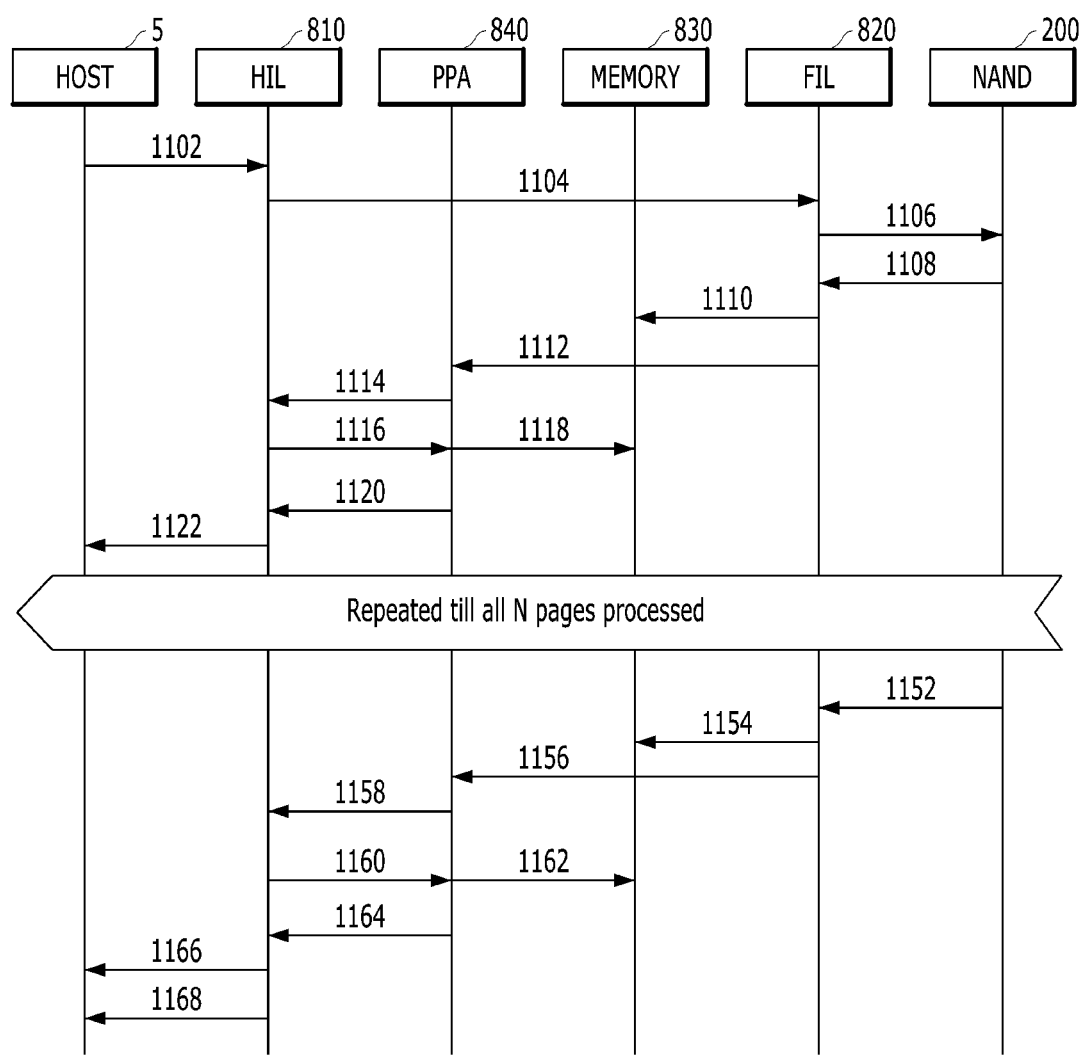
FIG. 11 illustrates a sequence for operating a memory system in accordance with an embodiment of the present invention.

FIG. 11 illustrates a sequence for operating a memory system in accordance with an embodiment of the present invention. The sequence may be controlled by the SSD controller 100 including the PPA 840.

Referring to FIG. 11, the host device 5 may transmit (issue) a filtered read command to the SSD controller 100 (1102). The HIL 810 may receive and recognize the filtered read command and add it to an execution queue (not illustrated). The HIL 810 may allocate resources for execution of the filtered read command and start the execution of the filtered read command (1104).

The FIL 820 may read a page from the NAND memory device 200 based on the filtered read command and write the read page to the SSD controller memory 830 (1106, 1108, 1110). The read page may correspond to pages ID's specified in the filtered read command. Then, the FIL 820 may notify the PPA 840 that the corresponding page has been transferred to the memory 830 and is ready to be processed (1112).

The PPA 840 may fetch task parameters corresponding to the page ID read by the FIL 820. In some embodiments, task parameters include the configuration of the PPA 840 and column full search conditions. In other words, the PPA 840 may transmit a command to get the task parameters to the HIL 810 (1114) and the HIL 810 may return the task parameters to the PPA 840 (1116).

The PPA 840 may read the page from the SSD controller memory 830 and find records matching the column full search constraints (or satisfying the column full search conditions) within the read page (1118).

The PPA 840 may transfer, to the HIL 810, an ID of the page in which record entries satisfying the column full search conditions (1120). The HIL 810 may transfer the page passed by the PPA 840, i.e., the page in which record entries satisfying the column full search conditions from the SSD controller memory 830 to the host device 5 (1122). After transferring, the HIL 810 may release a memory region of the SSD controller memory 830 allocated for this page.

The same operations may be performed for another page. That is, operations 1152-1166 corresponding to operations 1108-1122 may be performed. These operations may be performed until all N pages are processed. These operations are based on one page read from the NAND memory device 200 in response to each read access of the FIL 820.

Alternatively, two or more pages are read from the NAND memory device 200 in response to each read access of the FIL 820. This embodiment may be represented by the following Equation $\sum_{i=1}^{K} f_i = N$, where N is the total number of pages to read, K represents the number of FIL access to NAND required to read N pages, and $f_i$ represents the number of pages read from NAND on each FIL read access.

As described above, the SSD controller 100 may read multiple pages based on the filtered read command, filter pages including records satisfying the column full search conditions among the multiple pages and transmit the filtered pages to the host device 5. The PPA 840 may discard remaining pages among the multiple pages. The HIL 810 may transfer pages including database entries matching the search conditions to the host memory 730 based on the destination address in the filtered read command. When the multiple pages based on the filtered read command are processed, the HIL 810 may send a command completion notification and/or a command completion status to the host device 5 (1168).

An example of the database storage system is described with reference to FIGS. 12 and 13.

Figure 12:
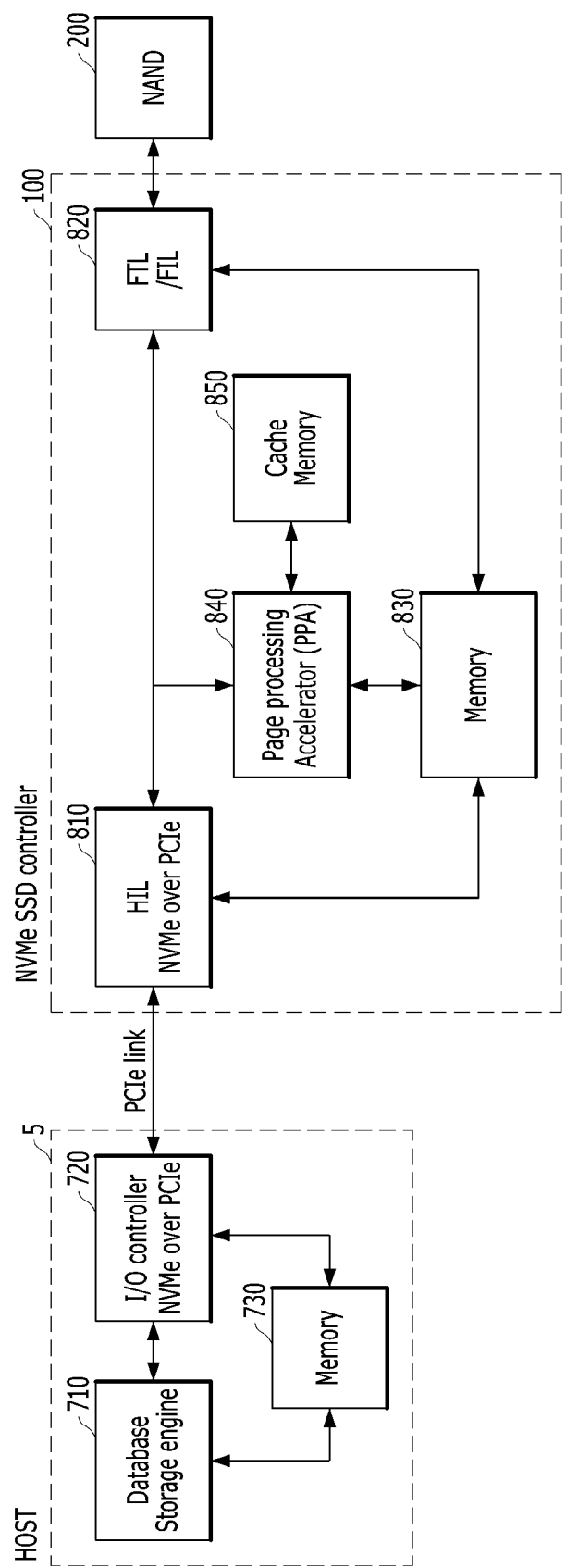
FIG. 12 is a diagram illustrating a database storage system in accordance with an embodiment of the present invention.

FIG. 12 is a diagram illustrating a database storage system in accordance with an embodiment of the present invention.

Referring to FIG. 12, the database storage system may include a host device 5 and the memory system including an SSD controller 100 and a memory device 200, as shown in FIG. 8. The memory system may be a hardware-accelerated database search SSD with non-volatile memory express (NVMe) over peripheral component interconnect express (PCIe) interface. That is, the host interface layer (HIL) 810 of the SSD controller 100 may support an NVMe over PCIe interface. On the side of the host device 5, the database storage system may be coupled with the SSD controller 100 via the I/O controller 720 as the NVMe over PCIe interface. The database storage engine 710 may issue NVMe commands to the SSD controller 100. The SSD may support vendor-specific commands such as set/get PPA configuration attribute and filtered read command. The database storage system may be aware of database files mapping to underlying SSD pages (i.e., NAND pages).

Before issuing a filtered read command, the database storage engine 710 may configure the page processing accelerator (PPA) 840 to the database page layout format used. The database storage system may use the page layout format such as NSM and PAX. The page in the PAX format is shown in FIG. 13. Below is a brief description of the PAX format layout. A more detailed description of PAX is found in: Anastassia Ailamaki, David J. DeWitt and Mark D. Hill, "Data Page Layouts for Relational Databases on Deep Memory Hierarchies," The International Journal on Very Large Data Bases (VLDB) 11, 198-215 (2002), which is incorporated by reference herein in its entirety.

PAX may partition each page into multiple minipages (e.g., n minipages) in order to store a relation with degree n (i.e., with n attributes). It then stores values of the first attribute in the first minipage, values of the second attribute in the second minipage, and so on. At the beginning of each page there is a page header that contains offsets to the beginning of each minipage. The record header information is distributed across the minipages.

Figure 13:
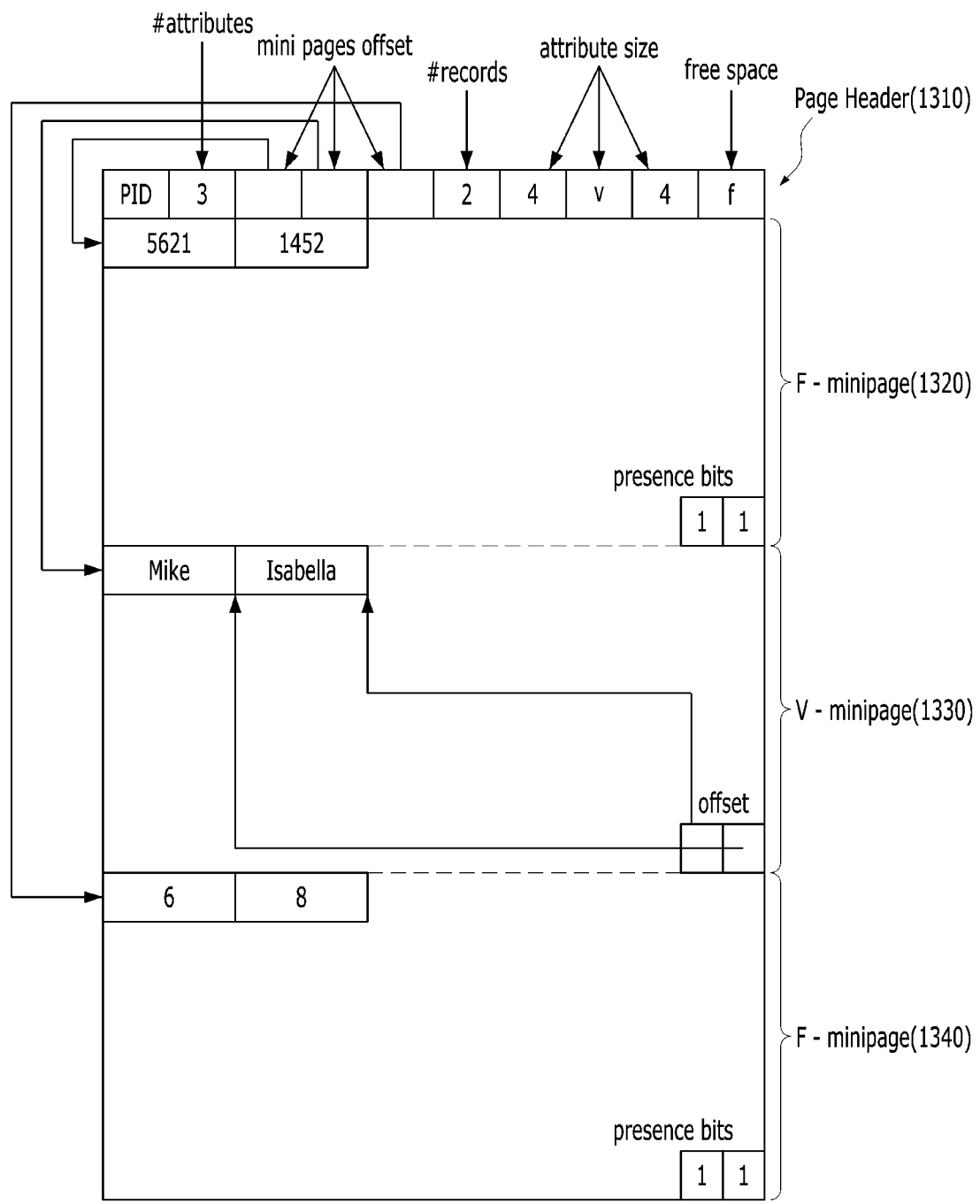
FIG. 13 illustrates a partition attributes across (PAX) page in accordance with an embodiment of the present invention.

Referring to FIG. 13, the PAX page may include a page header 1310 and multiple mini pages 1320-1340. The multiple mini pages may include two F mini pages 1320 and 1340 and one V mini page 1330. Fixed-length attribute values may be stored in the F mini pages 1320 and 1340. At the end of each F mini page, there is a presence bit vector with one entry per record that denotes null values for nullable attributes. Variable-length attribute values may be stored in the V-mini page 1330. V-mini page 1330 may be slotted, with pointers to the end of each value. Null values may be denoted by null pointers.

Each newly allocated page may include the page header 1310 and a number of mini pages 1320-1340 equal to the degree of the relation. The page header 1310 may include the number of attributes, the attribute sizes (for fixed-length attributes), offsets to the beginning of the mini pages, the current number of records on the page, and the total space still available. An example of the PAX page in FIG. 13 corresponds to employees' period of service in Table 1 as follows:

TABLE 1

| Employee ID | Name | Period of service |
|---|---|---|
| 5621 | Mike | 6 |
| 1452 | Isabella | 8 |

Table 1 shows deserialization into the PAX page in FIG. 13 in which two records have been inserted. There are two F mini pages, one 1320 for the employee ID attribute and other one 1340 for the length of the employment attribute. The name attribute is a variable-length string, therefore it is stored in the V mini page 1330. At the end of each V mini page, there are offsets to the end of each variable-length value.

Referring back to FIG. 12, the PPA of 840 may be configured to properly deserialize PAX pages. After initial configuration of the PPA 840 for accelerated database search, the SSD may be ready to receive and execute column full search tasks. Column full search tasks may be submitted through a NVMe vendor-defined command, named as the filtered read command. Batch PPA page processing flow may be performed according to the FRC execution flow in FIG. 11.

The PPA 840 may process a single page in an execution flow as listed below:

(1) For the next page to be processed, the PPA 840 may retrieve full-column search task parameters from the NVMe command submission queue of the HIL 810.

(2) Upon retrieval of column full search task parameters, the PPA 840 may read the page into the internal cache memory 850.

(3) The PPA 840 may deserialize rows and columns within the currently processed page according to the page header information and PPA configuration. The page header may include information sufficient to navigate between table rows and columns within the page.

(4) Deserialized rows and columns may be stored in the PPA cache memory 850. The PPA 840 may execute a search on table columns constrained in the search query. The PPA 840 may quickly access deserialized table data located in the cache memory 850 and execute a comparison operation on each column entry according to the column data type.

(5) Table records satisfying the search condition may be copied to the region of the PPA cache memory 850 reserved for the search results storage. The PPA 840 may issue notification to the HIL 810 upon each page search task completion. The notification may include information regarding the found records within the page that satisfies the search condition and the location of the found records in the cache memory 850. If no records have been found, the notification may include a corresponding status code.

Depending on the notification status received from the PPA 840, the HIL 810 may transfer, to the host device 5, pages which include records satisfying the search condition. Upon completion of search execution over all pages from the filtered read command, the HIL 810 may issue the FRC NVMe command completion status to notify the host device 5 about FRC completion. At this point, the SSD may return to the database storage system, i.e., the database storage engine 710, only the pages including records satisfying the search condition.

Accordingly, embodiments of the present invention provide a system for accelerated data search of a database storage system. A memory system (i.e., SSD) may read multiple pages based on a filtered read command, filter pages including records satisfying the column full search conditions among the multiple pages and transmit the filtered pages to a host device. Thus, embodiments of the present invention may offload resources (i.e., CPU and memory) of the database storage system (i.e., the host device) and speed up the column full search.

Although the foregoing embodiments have been illustrated and described in some detail for purposes of clarity and understanding, the present invention is not limited to the details provided. There are many alternative ways of implementing the invention, as one skilled in the art will appreciate in light of the foregoing disclosure. The disclosed embodiments are thus illustrative, not restrictive. The present invention is intended to embrace all modifications and alternatives that fall within the scope of the claims. Furthermore, the embodiments may be combined to form additional embodiments.

What is claimed is:

1. A system comprising:
a host device including a database storage engine; and
a memory system including a controller and a memory device, which includes a plurality of pages storing multiple records,
wherein the controller includes a page processing accelerator configured to:
read, from the plurality of pages, multiple pages in response to a filtered read command;
filter particular pages among the multiple pages based on a column full search condition, the filtered pages including entries satisfying the column full search condition, wherein any of the multiple pages that do not contain records satisfying the column full search condition are discarded without transfer to the host device; and
transfer, to the host device, information regarding the filtered pages satisfying the column full search condition.

2. The system of claim 1, wherein the filtered read command includes the column full search condition and a set of page identifiers (IDs) to search for which correspond to the multiple pages.

3. The system of claim 2, wherein the host device further includes a host memory, and
the filtered read command further includes a destination address of the host memory to write the data of the filtered pages.

4. The system of claim 1, wherein the controller sends, to the host device, a completion notification after transferring of the data of the filtered pages is completed.

5. The system of claim 1, wherein the controller configures the page processing accelerator in response to the filtered read command.

6. The system of claim 1, wherein the controller includes:
a host interface layer (HIL) configured to interface with the host device;
a flash interface layer (FIL) configured to interface with the memory device; and
a controller memory configured to store the multiple pages.

7. The system of claim 1, wherein each of the plurality of pages stores one or more among the multiple records in a partition attributes across (PAX) format.

8. The system of claim 7, wherein the page processing accelerator deserializes rows and columns within each of the multiple pages according to page header information to generate a deserialization table.

9. The system of claim 8, wherein the page processing accelerator determines whether each of column entries of the deserialization table satisfies the column full search condition.

10. The system of claim 9, wherein the controller transfers, to the host device, the information regarding the filtered pages, each filtered page including one or more column entries satisfying the column full search condition.

11. A method for operating a system including a host device including a database storage engine, and a memory system including a controller and a memory device, which includes a plurality of pages storing multiple records, the method comprising:
configuring a page processing accelerator in the controller;
reading, by the page processing accelerator, from the plurality of pages, multiple pages in response to a filtered read command;
filtering, by the page processing accelerator, particular pages among the multiple pages based on a column full search condition, the filtered pages including entries satisfying the column full search condition, wherein any of the multiple pages that do not contain records satisfying the column full search condition are discarded without transfer to the host device; and
transferring, by the controller, to the host device, information regarding the filtered pages satisfying the column full search condition.

12. The method of claim 11, wherein the filtered read command includes the column full search condition and a set of page identifiers (IDs) to search for which correspond to the multiple pages.

13. The method of claim 12, wherein the filtered read command further includes a destination address of a host memory in the host device to write the data of the filtered pages.

14. The method of claim 11, further comprising:
sending, to the host device, a completion notification after transferring of the data of the filtered pages is completed.

15. The method of claim 11, wherein the page processing accelerator is configured in response to the filtered read command.

16. The method of claim 11, wherein the controller includes:
a host interface layer (HIL) configured to interface with the host device;
a flash interface layer (FIL) configured to interface with the memory device; and
a controller memory configured to store the multiple pages.

17. The method of claim 11, wherein each of the plurality of pages stores one or more among the multiple records in a partition attributes across (PAX) format.

18. The method of claim 17, wherein the filtering of the particular pages among the multiple pages based on a column full search condition includes:
deserializing rows and columns within each of the multiple pages according to page header information to generate a deserialization table.

19. The method of claim 18, wherein the filtering of the particular pages among the multiple pages based on a column full search condition includes:
determining whether each of column entries of the deserialization table satisfies the column full search condition.

20. The method of claim 19, wherein the transferring of the information regarding the filtered pages includes:
transferring, to the host device, the information regarding the filtered pages, each filtered page including one or more column entries satisfying the column full search condition.

* * * * *